July 22, 1969   G. M. GURLEY   3,456,477
CRIMPING APPARATUS HAVING STRIP FEEDING MEANS
Filed July 7, 1967   7 Sheets-Sheet 1

United States Patent Office 3,456,477
Patented July 22, 1969

3,456,477
CRIMPING APPARATUS HAVING STRIP FEEDING MEANS
Grey Manning Gurley, Clearwater, Fla., assignor to AMP Incorporated, Harrisburg, Pa.
Filed July 7, 1967, Ser. No. 651,769
Int. Cl. B21d 28/00, 43/10; B21j 11/00
U.S. Cl. 72—337                                 6 Claims

ABSTRACT OF THE DISCLOSURE

Apparatus for crimping open U-type connecting devices onto wires has conveyor chain which is indexed along a path extending from a loading station to a crimping station thence to an unloading station. Connecting devices are provided in the form of a continuous ladder strip and are severed from the carrier strips of the ladder strip at the loading station and picked up by a conveyor. Uncrimped connectors are delivered to crimping dies in the crimping zone and finished crimped connections are carried from the crimping zone to an unloading station.

BACKGROUND OF THE INVENTION

The co-pending application of Richard E. Reem and John R. Vickery, Jr., Ser. No. 539,230, now Patent No. 3,328,872, discloses and claims an apparatus for trimming the ends of a pair of wires extending axially towards each other and subsequently crimping an open U-type connecting device onto the trimmed ends. Tools in accordance with the Vickery and Reem invention are finding wide acceptance, particularly in the telephone industry where they are used for connecting the numerous individual conductors in the ends of telephone cables which must be spliced to each other. A conventional telephone cable will contain numerous pairs of associated conductors, the largest size cables presently being used containing about 2,700 pairs of conductors or 5,400 individual conductors. When the end of one cable is spliced to the adjacent end of a second cable to form a continuous telephone cable, the individual conductors in each cable end must be electrically connected to each other. Furthermore, the connections must be made between corresponding pairs of conductors in the cable ends rather than indiscriminately among the numerous conductors.

When a cable splicing operation is carried out, the ends of the cables being spliced are located adjacent to each other and a portion of the cable sheath is removed to expose the individual conductors. It is necessary to so locate the cable ends such that some slack remains in the conductors to permit the lineman to locate them in the tool. The lineman then proceeds to make the cable splice by selecting conductors from the cable ends, placing them in the crimping tool, and actuating the tool. Tools of the type disclosed and claimed in the above-identified U.S. Patent No. 3,328,872, have been found to be highly advantageous in the telephone industry for the reason that they substantially increase the number of connections which can be made by a telephone splicer in a given amount of time.

Open U-type connectors of the general type which are adapted to be crimped by the Reem and Vickery tool described above can be conveniently manufactured in the form of a continuous ladder strip comprising a pair of spaced-apart parallel carrier strips between which the individual connectors extend and with which the connectors are integral. The present invention is directed to the provision of an improved apparatus having means for separating the individual connectors from the carrier strip, conveying the connectors to the crimping zone of the apparatus, and finally conveying the crimped electrical connections to an unloading zone which is located in the vicinity of the cable ends. The technician making the splice thus does not need to concern himself with the handling of the connectors nor need he concern himself with the operation of unloading the crimped electrical connections from the apparatus. The lineman can thus concentrate on the essential operations of selecting the appropriate conductors in the cable ends, positioning these ends in the tool, and actuating the tool. The particular embodiment of the invention disclosed below is adapted to crimp two open U-type connectors during a single operating cycle so that the conductors of two pairs in the cable ends can be connected during a single cycle. It will be apparent, however, that the principles of the invention can be applied to more simplified types of crimping devices which crimp only a single connector in each operating cycle.

It is accordingly, an object of the invention to provide an improved apparatus for crimping open U-type connectors onto the ends of the wires. It is a further object to provide a crimping apparatus having improved connector feeding means. It is a still further object to provide a device for crimping open U-type connectors having means for separating the connectors from a continuous carrier strip, means for conveying the connectors to a crimping zone, and finally means for conveying the crimped connections to an unloading zone. It is a further object to provide an improved apparatus for crimping, during a single operating cycle, two electrical connectors onto the conductors of two pairs of conductors extending towards each other.

These and other objects of the invention are achieved in a preferred embodiment thereof comprising a pair of crimping dies and a pair of crimping anvils which are movable relatively towards and away from each other to simultaneously crimp two open U-type electrical connectors onto the ends of four conductors. The connectors are provided in the form of a continuous ladder strip having a pair of parallel carrier strips between which the connectors extend and with which the connectors ends are integral. The individual connectors are severed from this ladder strip in a loading zone of the apparatus and are loaded onto a conveyer. The conveyer comprises a chain which is indexed along a path extending from the loading zone, through the crimping zone, which is between the die and anvils of the apparatus, thence to an unloading zone. The conveyer and the connector severing the loading mechanism are actuated by the same actuator, a simple hand crank in the disclosed embodiment, that is used to move the dies and anvils relatively towards and away from each other. When the device is used for splicing the conductors of a telephone cable, it will normally be mounted adjacent to the cable with the unloading station of the conveyer proximate to the axis of the cable so that the finished crimped connections will be automatically delivered to the partially spliced cable without any attention from the operator.

The invention is herein disclosed in an embodiment comprising a tool for crimping, during a single operation cycle, two open U-type electrical connectors onto the corresponding ends of two pairs of electrical conductors; that is, a first connector is crimped onto the ends of two wires and a second connector is crimped onto the ends of the remaining two wires. The structure of the crimping dies and anvils of this apparatus are fully disclosed in the co-pending application of Grey M. Gurley and William R. Over, Ser. No. 625,096, filed Mar. 22, 1967. The present invention is directed to the means for severing the connectors from a carrier strip, conveying these connectors to the crimping zone of the apparatus, and finally conveying the finished crimped connections to an unloading zone. In the description which follows, the crimping dies and anvils, and the structure associated with these dies and anvils, will be described only briefly and to the extent necessary for an understanding of the present invention. Reference is made to the above-identified Gurley and Over application, Ser. No. 625,096, for further details of the crimping means of the herein disclosed tool.

Figures 1, 3, 4, 5:
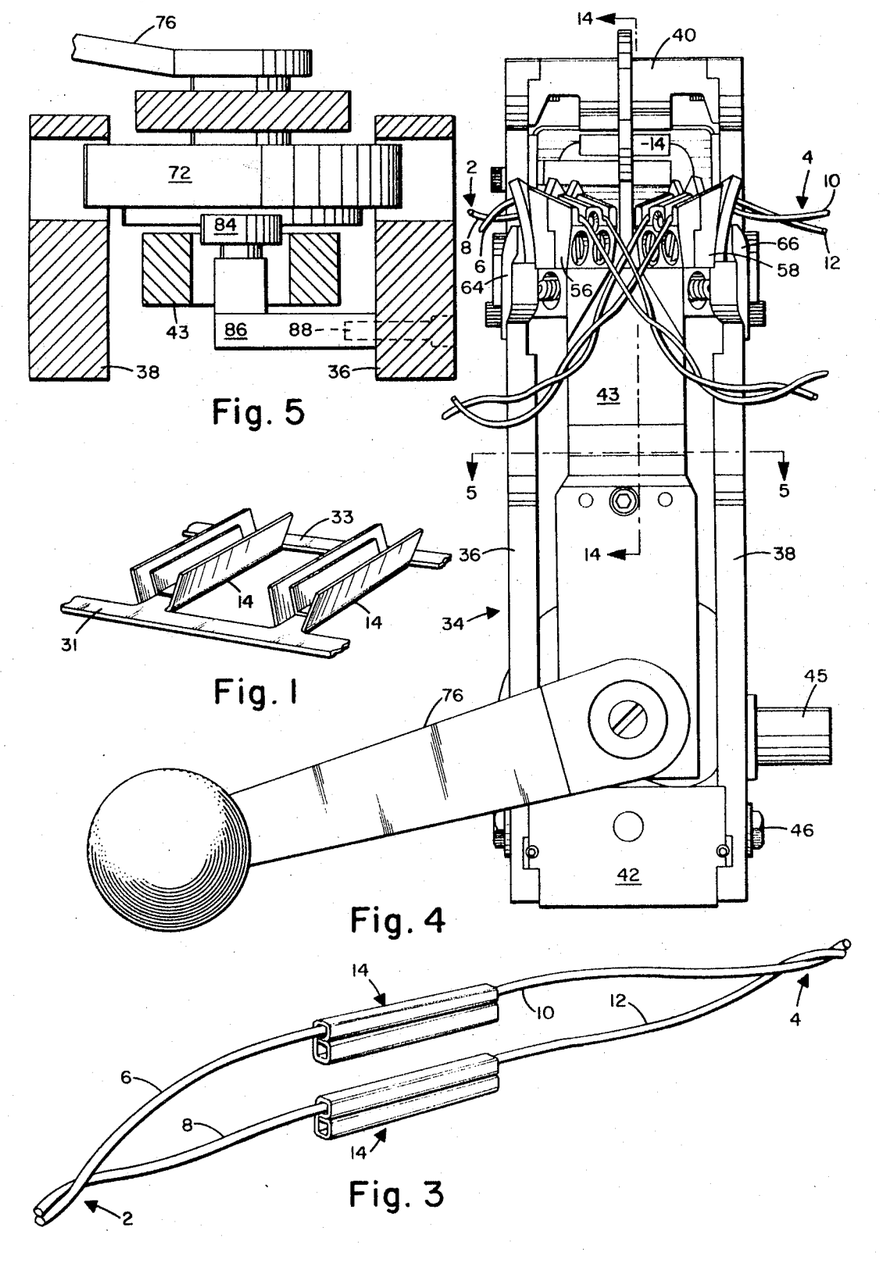
FIGURE 1 is a perspective view of a short section of connector strip of the type adapted to be used in the disclosed embodiment of the invention.
FIGURE 3 is a perspective view of a pair of conductors with the corresponding wires in the conductors connected to each other by connectors of the type shown in FIGURE 2.
FIGURE 4 is a top plan view of an apparatus in accordance with the invention showing the positions of the parts at the beginning of the operating cycle.
FIGURE 5 is a view taken along the lines 5—5 of FIGURE 4.
Figures 2, 6, 7:
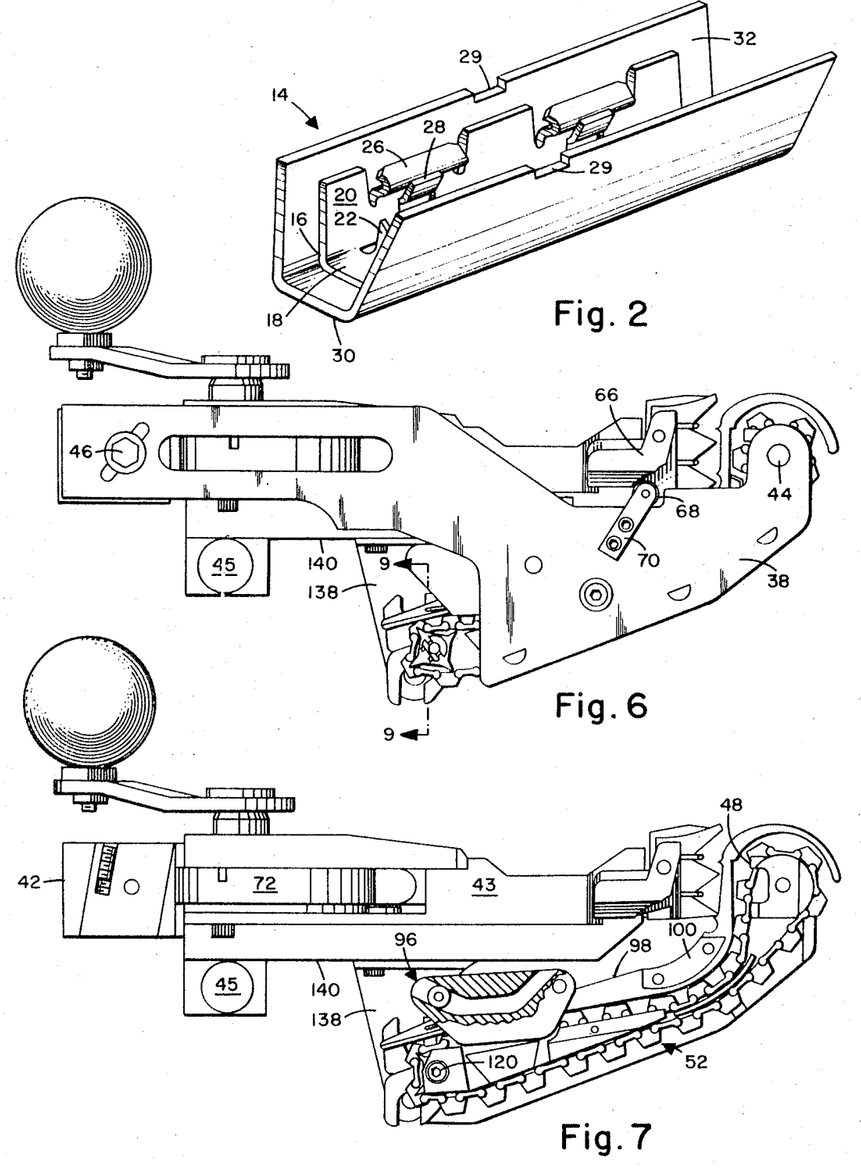
FIGURE 2 is a perspective view of an individual connector showing details of the construction of the connector.
FIGURE 6 is a side view of the apparatus of FIGURE 1 showing the positions of the parts at the beginning of the operating cycle.
FIGURE 7 is a sectional side view of the apparatus of FIGURE 4.

Referring first to FIGURES 1–3, the disclosed embodiment of the invention is adapted to crimp the conductors of a pair 2 to the conductors of a second pair 4. The conductors 6, 8 of the pair 2 are twisted together, as shown in FIGURE 3, as is common practice in the telephone industry, and the conductors 10, 12 of the pair 4 are similarly twisted together. The conductor 10 is electrically connected to the conductor 6 by a crimped connection 14, and the conductor 12 is similarly connected to the conductor 8 by a second crimped connection 14.

Figure 2A:
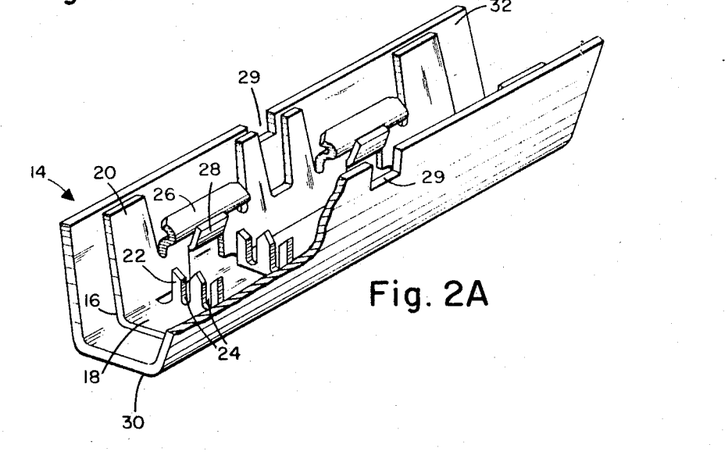
FIGURE 2A is a view similar to FIGURE 2 but with parts broken away to show details of the connector.

As shown in FIGURES 1, 2, and 2A, the individual connectors 14 each comprise a metallic channel member 16 having a floor or web 18 and having upstanding sidewalls 20. Tongues 22 are struck-up from the web 18, two such tongues being provided adjacent to each end of the connector, and downwardly extending notches 24 are provided in these tongues. The sidewalls 20 on each side of the tongues and between the tongues have inwardly formed sections 26 and tabs 28 are struck from the material of the sidewalls. A film 30 of insulation such as Mylar (polyethylene terephthalate) is bonded to the external surface of the metallic channel member and extends laterally beyond the ends of the connector and upwardly beyond the sidewalls. The upper edges of this film are irregular and are notched as shown at 29 at a location midway between the ends of the connector. The film 30 of the connector is integral with continuous carrier strips 31, 33, the connectors being manufactured in the form of a continuous strip so that the individual connectors must be separated from these carrier strips at the time of application to the wires.

When a connector 14 is crimped onto the ends of two wires, the wires are located between the sidewalls of the connector and the sidewalls are bent inwardly and downwardly towards the web so that the wires are forced into the notches 24 in the tongues. The notches have a width which is less than the insulation of the wires and slightly less than the diameter of the metallic cores of the wires so that the sides of the notches penetrate the insulation and make electrical contact with the cores. Further details of connectors of this type are set forth in U.S. Patent No. 3,320,354, to which reference is hereby made.

A tool 34 (FIGURE 4) having a connector conveyer in accordance with the invention comprises a pair of parallel side plates 36, 38 which straddle a stationary frame block 43. The side plates are held in spaced-apart relationship by a first spacer member 40 at the upper end of the tool, as viewed in FIGURE 4, and a second spacer block 42, at the lower end of the tool, which houses an actuating cam roller. The stationary frame member 43 has a laterally extending cylindrical boss 45 by means of which it is mounted on a suitable work support or stand adjacent to the cable which is being spliced. Application Ser. No. 457,150, filed May 19, 1965, now abandoned, shows one form of work support or stand for tools of the type herein described. The spacer 40 is secured to the sideplates by means of screws 44 and the spacer block 42 is secured to the side plates by suitable screws 46.

Figures 14, 15:
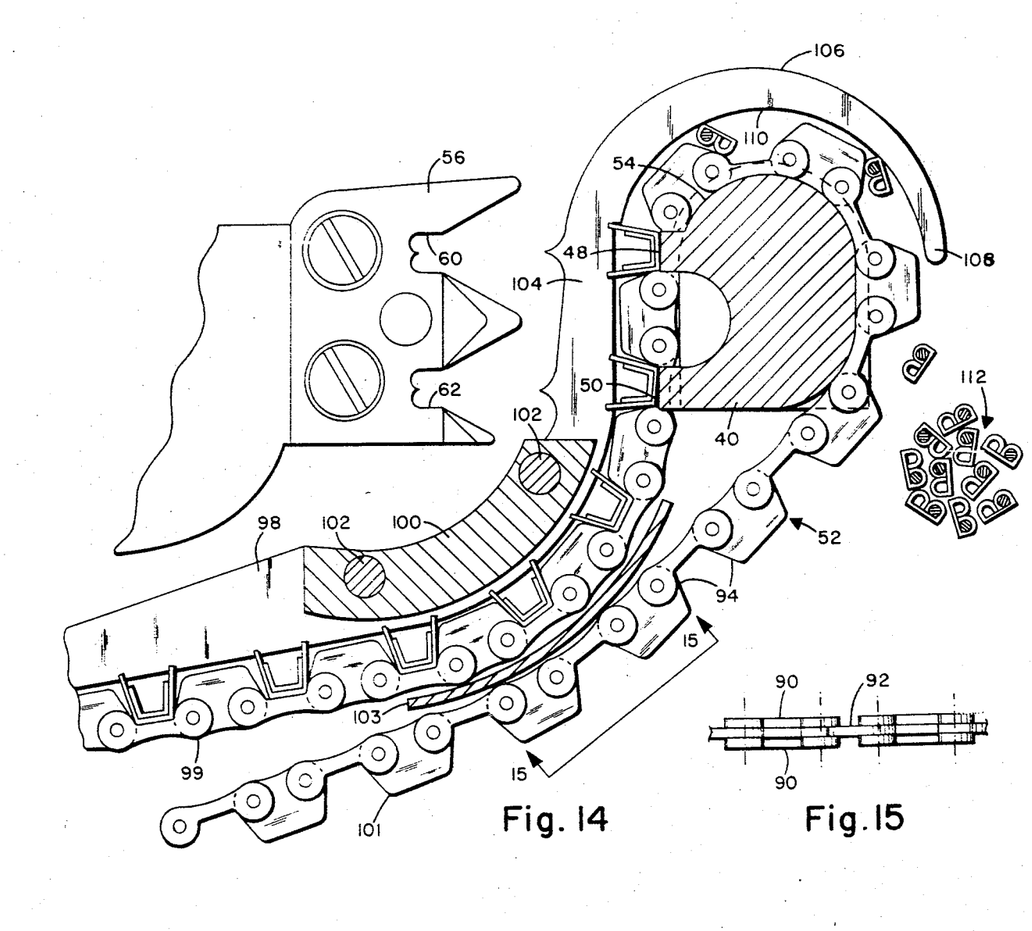
FIGURE 14 is a view taken along the lines 14—14 of FIGURE 4 and showing the crimping zone and the unloading of the apparatus on an enlarged scale.
FIGURE 15 is an end view of the conveyer chain taken along the lines 15—15 of FIGURE 14.

As best shown in FIGURES 7 and 14, the block 40 has a pair of side-by-side anvils on its lefthand side as viewed in FIGURE 14 which provide surfaces 48, 50 on which the connectors are supported during crimping. The individual connectors are carried to these anvil supporting surfaces by means of a conveyer chain generally indicated at 52. This chain travels along a closed circuit path which extends between the anvils and crimping die structure 56 described below, through a slot 54, which extends around the block 40 midway between the ends thereof, thence leftwardly in FIGURE 7 to the indexing mechanism which will be described subsequently.

Figure 4A:
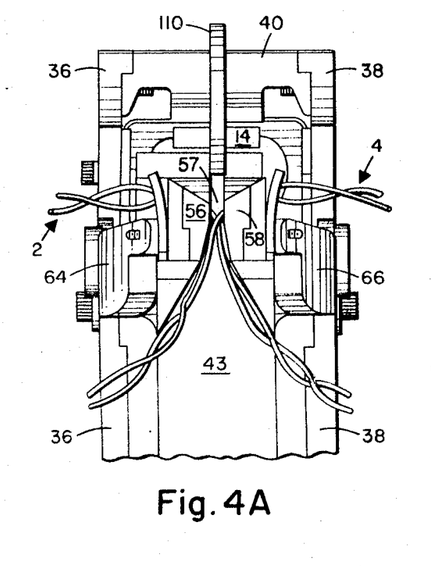
FIGURE 4A is a fragmentary view of the end portion of the tool of FIGURE 4 and showing the positions of the crimping dies at an intermediate stage of the operating cycle.
Figure 4B:
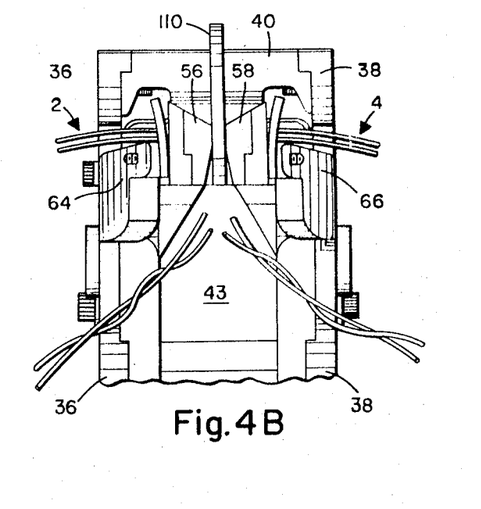
FIGURE 4B is a view similar to FIGURE 4A but showing the positions of the parts at the time of completion of the crimping operation.

The connectors are crimped onto the wires by means of a die structure comprising a pair of die blocks generally indicated at 56 and 58. These die blocks are mounted on the stationary frame member 43 on pivotal axes which extend generally vertically as viewed in FIGURE 4 and which permit the individual die blocks to be swung from an opened position (FIGURE 4) to an alined position (FIGURE 4A) during relative movement of the anvils towards the dies. The sides of these die blocks which face the anvil surfaces are provided with spaced-apart die cavities 60, 62 (FIGURE 14) in which the wires being connected 6, 8, 10, 12 are positioned at the beginning of the operating cycle. The die block 56 has a rearwardly extending arm 64 and the block 58 has a similar rearwardly extending arm 66. The undersides of these arms are engaged by rollers 68 (see FIGURE 6) mounted on brackets 70 secured to the side plates 36, 38. FIGURE 6 shows the cam roller and supporting bracket 70 mounted on the right hand side of the tool, it being understood that a similar roller and supporting bracket are provided on the letfhand side, that is, on the side plate 36.

As explained fully in application Ser. No. 652,096, the anvils move relatively toward the die blocks during the operating cycle and the die blocks 56, 68 are swung about their pivotal axes (contained in the frame block 43) until the die blocks, and therefore the cavities in the die blocks, are in alignment with each other, FIGURE 4A. During further movement of the anvils towards the die blocks and when the die blocks are in their aligned positions, a cutter bar 104 (described below) moves relatively into the slot 57 which remains between the die blocks and trims the ends of the wires. Upon still further movement of the anvils towards the dies, the uncrimped connectors are crimped onto the trimmed wire ends.

Figure 8:
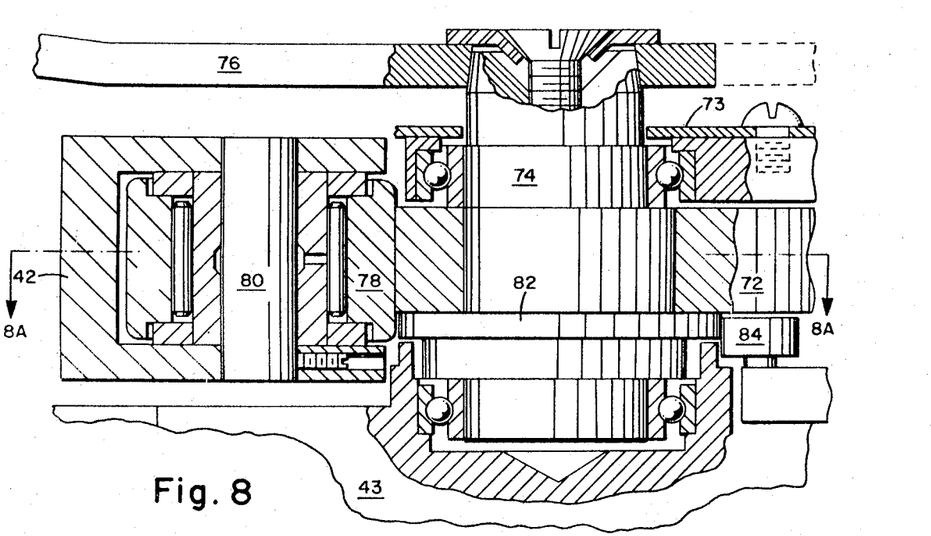
FIGURE 8 is a sectional side view, on an enlarged scale, of the lower portion of the tool as viewed in FIGURE 1 and showing the actuating mechanism for the tool.
Figures 8A, 11A:
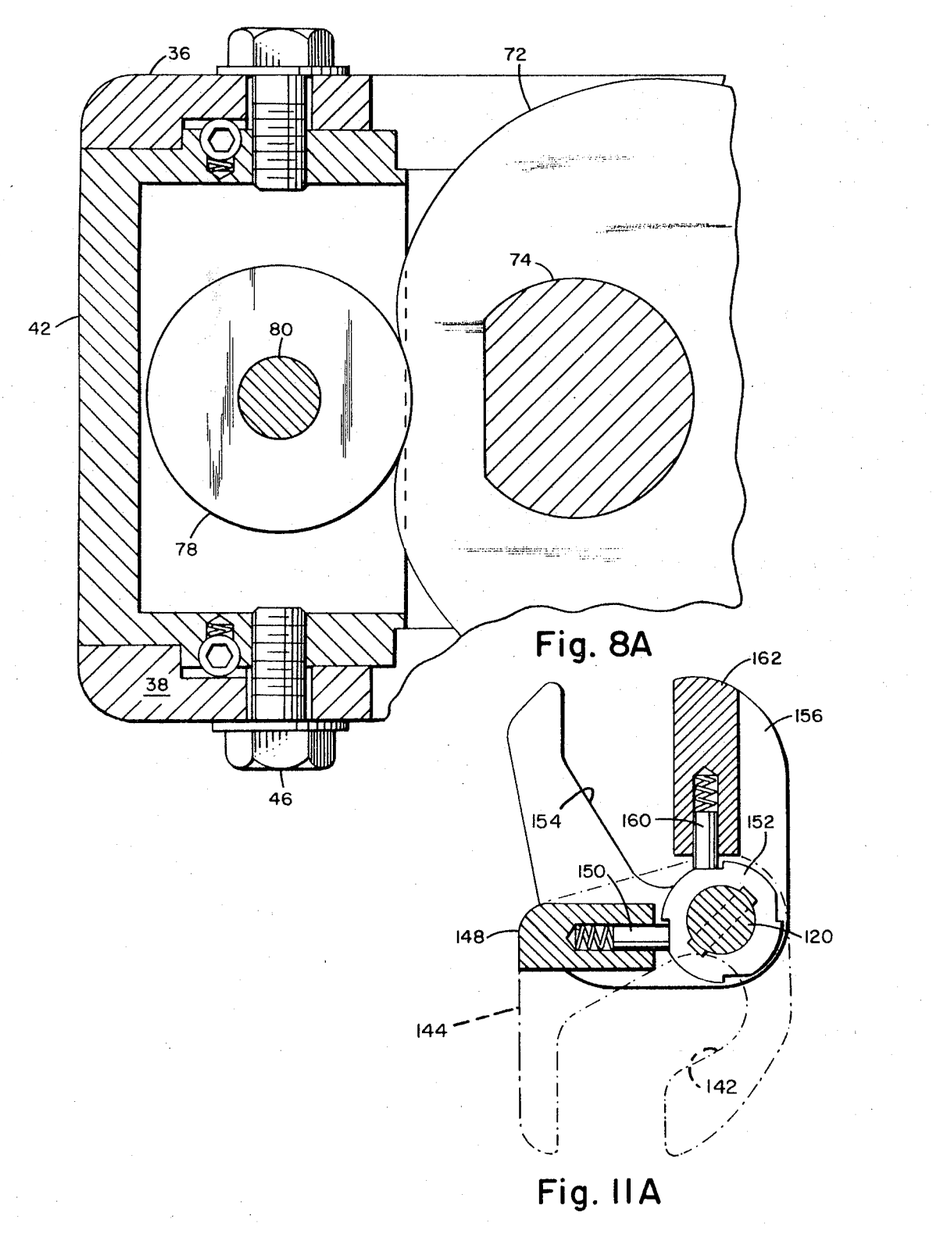
FIGURE 8A is a view taken along the lines 8A—8A of FIGURE 8.
FIGURES 10, 11, and 11A are views taken along the lines 10—10, 11—11, and 11A—11A of FIGURE 9.
Figures 9, 10:
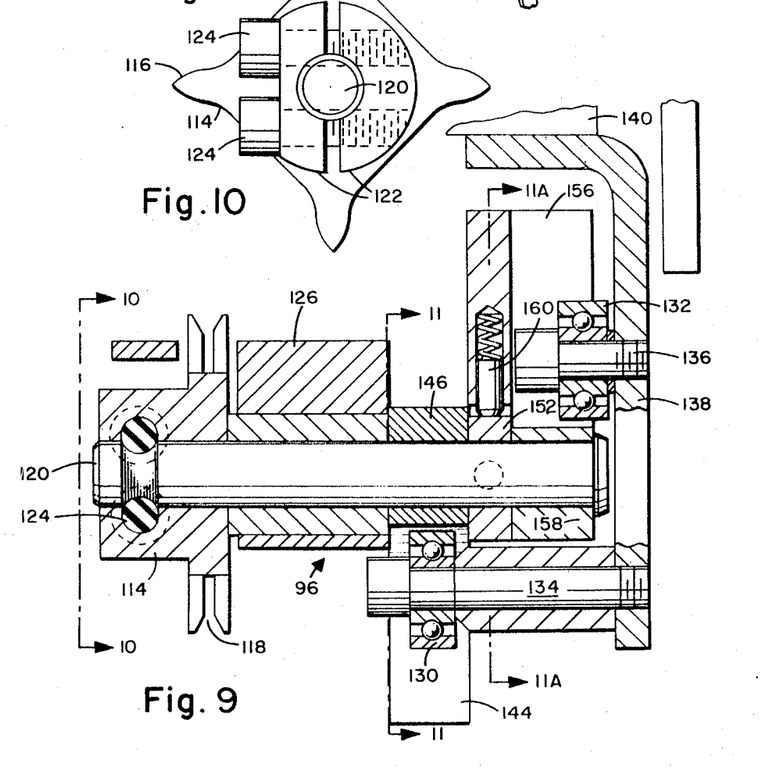
FIGURE 9 is a view taken along the lines 9—9 of FIGURE 6.

The side plates are moved relatively downwardly as viewed in FIGURE 4 during the operating cycle thereby to move the anvils relatively towards the die blocks. Such movement of the side plates, that is, the movable portions of the tool as opposed to the stationary frame member 43, is achieved by means of a cam 72 (FIGURES 5 and 8) mounted on a shaft 74 which extends vertically through the stationary frame member 43 and is supported in this frame member by suitable bearings as shown in FIGURES 8 and 8A. The end of this shaft 74 projects beyond the surface of a cover plate 73 on the frame member and has a handle 76 extending therefrom to permit the operator to turn the shaft 74 through a complete revolution during each operating cycle. Cam 72 is in engagement with a cam follower 78 mounted on a vertically extending shaft 80 in the previously identified housing or spacer 42 which extends between, and is secured to, the side plates 36, 38. The shape of the cam 72 is such that during each complete revolution of the handle 76, the housing 42 is moved leftwardly so that the side plates 36, 38 and the spacer block 40 on which the anvils are provided move relatively downwardly as viewed in FIGURE 4. The return movement of the side plates and housing 42 is achieved by means of a return cam 84 mounted on an L-shaped bracket 86 (see FIGURE 5) which extends from, and is secured to, the side plate 36 by a fastener 88. Cam follower 84 is engaged with the return cam 82 on the previously identified shaft 74 and is effective to return the part to their normal or starting positions (FIGURE 4) after the anvils have been moved for the full stroke towards the dies. As explained fully in application Ser. No. 652,096, the housing 42 is adjustably mounted on the side plates thereby to permit adjustment of cam follower 78 and adjustment of the shut height of the dies with respect to the anvils.

Referring now to FIGURE 14, the conveyor chain 52 is made up of alternate pairs of side-by-side links 90 which are pivotally secured to generally trapezoidal plate-like single links 92, the sides 94 of these plate-like single links 92 and the upper edges of the paired links 90 forming recesses in the conveyor chain which conform to the cross-section of an individual connector. The dimensions of these links are such that the connectors are loosely supported in the recesses as best shown in FIGURE 14. The path of movement of the conveyor extends along, and beneath, a guide bar generally indicated at 98 and secured to the side plate by means of a clamping plate 100 by screws 102. This guide bar extends upwardly, as viewed in FIGURE 14, between the die and anvil and provides a portion 104 which functions as a cutter member for cutting the wires extending through the slot 57 between the die and anvil. A further extension 106 of the guide bar follows the upper surface of the spacer block 40, the underside 110 of this extension being spaced from the surface of the spacer bar 40 by a distance such that the crimped electrical connections will be confined by the conveyor chain while the chain is indexed to the tip portion 108 of the guide bar. The finished crimped connections are then discharged when the conveyor chain passes the tip 108 of the guide bar and are released adjacent to the previously crimped electrical connections of the telephone cable. In FIGURE 14, a small bundle 112 of previously crimped electrical connections is shown to indicate the manner in which the finished crimped connections are delivered to the cable area.

The guide bar 98 extends leftwardly as viewed in FIGURES 7 and 14 towards the chain indexing mechanism which is generally indicated at 96 and which is located beneath the fixed frame member 43 midway between the ends of the tool. The upstream portion 99 of the chain which extends from this indexing mechanism towards the crimping zone is spaced from the lower edge of the guide bar by an amount such that the uncrimped connectors are contained by the chain and carried to the crimping area. As previously noted, the sidewalls of the connectors are provided with notches 29 midway between the ends of the connector. The lower edge of the guide bar extends into the notches of the connectors and assists in retaining the connectors in position as they are carried towards the crimping zone. A thin separator plate 103 is mounted on the side plates and extends between the upstream portion 99 and the downstream portion 101 of the chain, the terms "upstream" and "downstream" being used with reference to the crimping zone.

Referring now to FIGURES 7 and 9–13, the chain 52 is indexed by a sprocket wheel 114 having teeth 116. These teeth are slotted as shown at 118 and the links of the chain are adapted to enter these slots. Sprocket 114 is mounted on a shaft 120 by means of a split hub 122 which is clamped to the shaft by screws 124. The shaft 120 is supported for rotation in an extension 126 of a plate 128 (FIGURE 13) which extends between, and is secured to, the opposed faces of the side plates 36, 38 so that it moves with the side plates during the operating cycle. Shaft 120 is indexed by means of a pair of rollers 130, 132 mounted on the ends of stub shafts 134, 136 which extend from, and are secured to, a depending flange 138. The flange 138, in turn, is secured to the underside 140 of the frame 43 and is, therefore, stationary during the operating cycle. The roller 130 is received in a slot 142 in a first indexing arm 144. Arm 144 has an integral bearing portion 146 on the shaft 120 and has a relatively heavy and thick offset section 148 (FIGURE 11A) in which there is provided a spring biased detent 150 in engagement with a ratchet wheel 152 mounted on, and secured to, shaft 120. The roller 132 is received in a similar slot 154 in an indexing arm 156 which has a bearing portion 158 mounted on the shaft 120. Arm 156 has a detent 160 which is contained in a thickened offset section 162 as shown in FIGURE 11A. The bearing portions 146, 158 of these two arms are on opposite sides of the ratchet wheel 152 as viewed in FIGURE 9 and the relatively heavy sections of the arms in which the detents 150, 160 are contained are offset relative to these bearing portions so that the detents bear against the periphery of the ratchet wheel 152.

Figure 11:
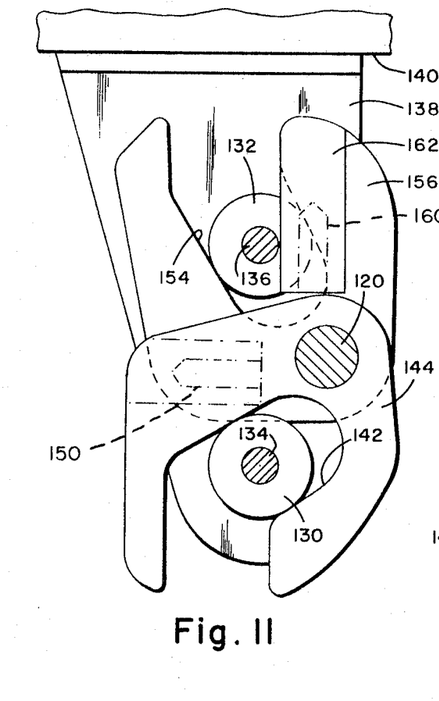
Figure 12:
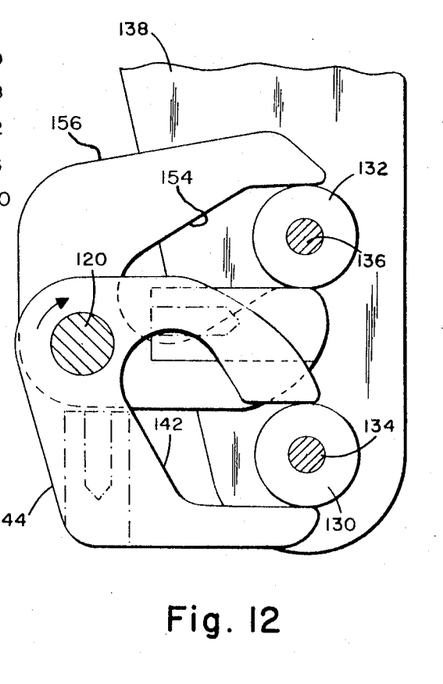
FIGURE 12 is a view similar to FIGURE 11 but showing the positions of the parts at a time midway through the operating cycle.

It will be apparent from FIGURES 11, 11A, and 12 that if either one of the arms 144, 156 is moved in a clockwise direction about the axes of the shaft 120, the detent 150, 160 will cause indexing of the shaft. However, counterclockwise movement of either of the arms will not effect the ratchet wheel.

The rollers 130, 132 cause each of the arms 144, 156 to move in a clockwise direction and then in a counterclockwise direction during the operating cycle in a manner such that the shaft 120 is indexed 90° during the first portion of the operating cycle and is indexed an additional 90° during the second portion of the operating cycle to feed the connector strip a distance equal to two pitches of the strip, that is, twice the distance between the connectors. The manner in which these rollers cause indexing of the shaft 120 is as follows.

At the beginning of the operating cycle, the parts will be as shown in FIGURE 11 with the arm 156 extending substantially vertically upwardly and with the arm 144 extending downwardly and obliquely leftwardly. During the initial portion of the operating cycle, during which the anvils and side plates are moved relatively towards the die blocks 56, 58, the shaft 120, which is movable with the side plates, 36, 38 will move leftwardly from the position of FIGURE 11, to the position of FIGURE 12 while the flange 138, which is mounted on the stationary frame, will remain stationary. The leftward movement of the shaft 120 relative to the rollers 130, 132 causes the indexing arm 156 to be rotated through a 90° angle in a clockwise direction thereby causing a 90° indexing of the shaft by virtue of the pawl detent arrangement described above. The indexing arm 144 will, during this interval, be rotated through a 90° arc in a counterclockwise direction, however, as noted above, counterclockwise direction of either arm is not effective to rotate the shaft. After the terminals have been crimped, and while the side plates 36, 38 are being returned to their initial positions, the shaft 120 will move rightwardly from the position of FIGURE 12 back to the position of FIGURE 11 while the rollers 130, 132 will remain stationary. During this interval, the indexing arm 156 will be rotated through a 90° angle in a counterclockwise direction and the indexing arm 144 will be rotated through a 90° arc in a clockwise direction. The clockwise rotation of the arm 144 will again cause indexing of the shaft by 90° while the counterclockwise rotation of the arm 156 will have no effect on the shaft.

The indexing of the arms 144, 156 takes place during the initial movement of the parts from the position of FIGURE 11 to the position of FIGURE 12; during the final portion of this movement the arms are not rotated relative to the shaft 130 but dwell in the positions of FIGURE 12. During reverse movement of the rollers 130, 132, from the position of FIGURE 12 back to the position of FIGURE 11, the arms are not indexed until the flange 138 has moved a short distance leftwardly in FIGURE 12. In other words, the arms 144, 156 dwell in the position of FIGURE 12 for an interval spanning the closed position of the die and anvil and extending from a time prior to crimping of the connectors to a time subsequent to the crimping of the connectors. This dwell of the arms 144, 156 is achieved by virtue of the shape of the slots 154, 142. This dwell is necessary in order to ensure that the connectors will be properly positioned on the anvils prior to the crimping operation and to permit the anvils to be moved relatively away from the crimping dies prior to indexing of the conveyer chain.

From the foregoing, it will be apparent that the connector strip is fed a distance equal to one pitch, that is, the spacing between adjacent connectors on the strip, during movement of the anvils towards the crimping dies and is fed an additional pitch during movement of the anvils away from the dies. Thus, the feeding of the strip for a given operating cycle takes place partially during that operating cycle and partially during the immediately preceding cycle.

Figure 13:
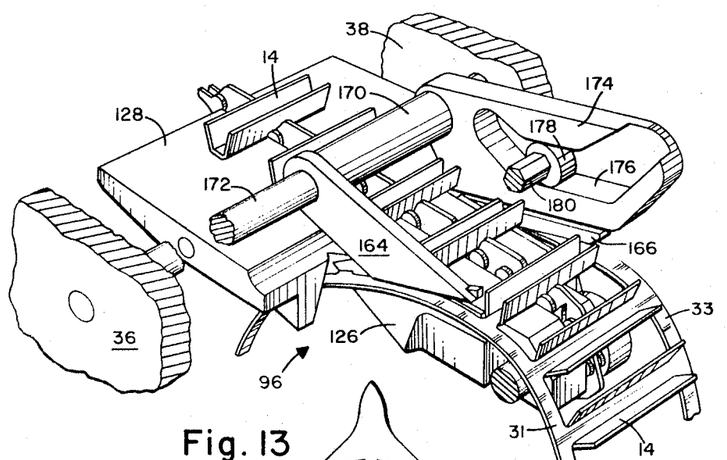
FIGURE 13 is a fragmentary perspective view showing the means for severing the individual connectors from the strip of connectors and loading the separated connectors onto the conveyer chain.

FIGURE 13 shows the mechanism for severing the individual connector from the carrier strips, 31, 33 at the location where the strip enters the underside of the apparatus and is picked-up by the conveyer chain 52. This mechanism comprises a pair of shearing blades 164, 166 located beside the extension 126 of the plate 128. Blade 164 extends from a sleeve 170 which is rotatably mounted on a rod 172, the ends of this rod being supported in the side plates 36, 38. Blade 166 is secured to the underside of a camming plate 174 which is also secured to the sleeve 170. The chain 52 passes through a suitable groove in the upper surface of plate 128 and beneath the sleeve 170 as shown. The width of the extension 126 is substantially equal to the length of one of a connector so that the carrier strips 31, 33 are located beside this extension and beneath the blades 164, 166.

The carrier strips are severed from the connectors upon downward movement of the severing blades 164, 166 relative to the extension 126, such downward movement being achieved by means of a cam track 176 in a plate 174 pivotally mounted on rod 172. A roller 178 is disposed in this cam track and is mounted on a shaft 180 which is supported in the stationary frame block 43. Cam track 176 is generally arcuate having its lowest section (relative to the plate 128) intermediate its ends. By virtue of this arrangement, the plate 174 is swung through a slight arc and then returned to its normal position whenever plate 174 is moved in either direction relative to the roller 178. When the plate 174 is moved through an arc about the axis of rod 172, both cutters are moved downwardly relative to the extension 126 to shear a connector from the carrier strips.

The plate 174 moves relative to the roller 178 during each operating cycle since the plate is carried by the side plates 36, 38 and the roller 178 is carried by the stationary frame portion 43 of the apparatus. FIGURE 13 shows the positions of the parts when the plate 174 is being lifted by the roller 178, the positions they will occupy once during each stroke, that is, after the anvils have travelled partially towards the die and before crimping takes place and again when the dies are partially returned to their initial position after crimping takes place.

It will be recalled, from the discussion presented above, that feeding takes place in two steps, one step being carried out immediately before crimping and the other step being carried out immediately after crimping. Two shearing operations are also carried out during each cycle, one being carried out when the dies and anvils are in their closed position and the other being carried out when the side plates move upwardly.

The operation is as follows: the parts will normally be in the position of FIGURE 4 with the two sections 56, 58 of the die facing obliquely with respect to the center line of the tool as shown in FIGURE 4. The operator first takes one of the pairs 4, spreads the wires 10, 12 slightly, and positions one wire in each of the die cavities 60, 62 of the right hand die section 58. He then takes the pair 2, spreads the wires 6, 8 apart and positions one of the wires in each of the die cavities 60, 62 of the die section 56. If he wishes to connect the wire 10 to the wire 6, he must position the wire 10 in the rearward die cavity 62 of the die section 58 and then he must position the wire 6 in the rearward die cavity 62 of the die section 56. The wires 8, 12 will, of course, be positioned in the forward cavities 60 of the two sections of the die. The operator then merely turns the crank 76 through a complete revolution to cause the side plates to move leftwardly as viewed in FIGURE 6. This leftward movement of the side plates causes pivotal movement of the dies until they are side-by-side (FIGURE 4A) and concomitant movement of the anvils towards the dies. The cutter bar 104 moves relatively through the slot 57 between the die sections with concomitant shearing of the wires and crimping of the electrical connectors onto the trimmed wire ends. During the final portion of the stroke of the crank 76, the anvils are returned to their initial positions.

During the operating cycle as described immediately above, the shaft 120 moves leftwardly from the position of FIGURE 11 to the position of FIGURE 12 then rightwardly from the position of FIGURE 12 back to the position of FIGURE 11. This movement of the shaft results from the fact that the shaft is journalled in the extension 126 of the plate 128 which, in turn, is contained between and secured to the side plates 36, 38. The side plates are, in turn, moved by the cam 72, 84 relative to the frame. The rollers 130, 132, however, remain stationary during the operating cycle since these rollers are mounted on shafts 134, 136 secured to the bracket or flange 138 which is secured to the underside 140 of the stationary frame 43. As a result, the arms 144, 156 are indexed through a 90° arc in both directions during the operating cycle. Only the clockwise movement of these arms causes the shaft 120 to be rotated through the detent mechanism shown in FIGURE 11A. Rotation of the shaft, of course, causes the sprocket wheel 114 to be rotated thereby indexing the chains.

The severing of the individual connectors from the continuous ladder strip takes place as described above, that is, by lowering of the cutter blades 164, 166 under the influence of the roller 178 which is received in the camming slot 176 of the plate 174. The plate as noted above is secured to the collar or sleeve 170 which is rotatably mounted on the shaft 172 which extends between and has its ends mounted in the side plates 36, 38.

In general, the instant invention is highly advantageous for crimping tools adapted to use terminals in ladder strip form in that it provides a means for severing the individual terminals from the ladder strip at a point remote from the crimping area, conveying the terminals to the crimping area, and finally delivering the finished crimped connections to an unloading zone. The unloading zone can be conveniently adjacent to a telephone cable or to a receptacle or bin in the case of other types of crimping tools. This advantage of the invention is not necessarily limited to tools of the type which are adapted to form two crimped electrical connections in one operating cycle but is also desirable with the more conventional type of tool which makes only a single crimped connection during each operating cycle. The specifically disclosed embodiment of the invention, in which two electrical connections are crimped during a single operating cycle, is particularly advantageous for crimping the pairs of conductors in telephone cables. In telephone splicing operations, the lineman or technician deals with the wires as pairs, that is, with the pairs 2, 4 rather than with individual wires. Thus, after a lineman has identified the pairs 2, 4 in a given cable, and has separated these pairs from the bundle of pairs in the cable ends, he need only position the wires of the pairs in the side-by-side crimping die cavities of the die blocks and turn the handle through a complete revolution to form the two finished crimped connections. He does not, in other words, connect the wires individually and go through two crimping operations to get the two crimped connections. This feature of the invention has the advantage of substantially reducing the possibility of error which might otherwise occur, particularly as regards the possibility of connecting the wire 10 to, for example, the wire 6 rather than the wire 8 and connecting the wire 8 to the wire 10 rather than to the wire 12.

Changes in construction will occur to those skilled in the art and various apparently different modifications and embodiments may be made without departing from the scope of the invention. The matter set forth in the foregoing description and accompanying drawings is offered by way of illustration only. The acutal scope of the invention is intended to be defined in the following claims when viewed in their proper perspective against the prior art.

What is claimed is:

1. In an apparatus for crimping electrical connecting devices onto wires, said connecting devices being in the form of a ladder strip comprising a continuous carrier strip with said connecting devices integral with, and extending laterally of, said carrier strip, said apparatus comprising:

a pair of crimping members movable relatively towards and away from each other, a flexible conveyer movable along a path extending from a loading zone towards and past said crimping members, said conveyer having spaced-apart connecting device holding means thereon, the spacing between adjacent holding means on said conveyer being equal to the pitch of said strip, means for loading said strip onto said conveyer in said loading zone, means for indexing said strip whereby said strip is fed towards said crimping members, and severing means beside said path between said loading zone and said crimping members for separating said connecting devices from said carrier strip whereby said connectors are delivered to said crimping members in loose piece form.

2. Apparatus as set forth in claim 1 wherein said conveyer comprises a chain, said holding means comprising spaced-apart recesses in said chain, said recesses being adapted to receive said connectors whereby said connectors are carried along said path.

3. Apparatus as set forth in claim 1 wherein one of said crimping members has a transverse slot therein, said path extending through said slot whereby said connectors are carried to and positioned on, said one crimping member.

4. Apparatus as set forth in claim 1 wherein said conveyer comprises a chain, said holding means comprising spaced-apart notches in said chain, said notches having a cross-section conforming to the cross-section of said connectors whereby said strip can be fed by said conveyer, said severing means comprising means on each side of said path for shearing said connectors from carrier strips on each side of said connecting devices.

5. Apparatus as set forth in claim 1 including a second pair of crimping members disposed adjacent to said first pair of crimping members, said indexing means being operative to index said conveyer a distance equal to twice the pitch of said strip, said apparatus being adapted to crimp two electrical connecting devices onto wires during each operating cycle.

6. Apparatus as set forth in claim 1 including an unloading zone downstream, relative to the path of movement of said conveyer, from said crimping members, and means for effecting conveyance of crimped connecting devices from said crimping members to said unloading zone and discharge of said crimped connecting devices at said unloading zone.

References Cited

UNITED STATES PATENTS

| 3,030,694 | 4/1962 | Kerstetter et al. | 29—203 |
| 3,140,733 | 7/1964 | Ullman et al. | 72—427 |
| 3,328,872 | 7/1967 | Reem et al. | 29—203 |

RONALD D. GREFE, Primary Examiner

U.S. Cl. X.R.

72—405, 422, 427